(12) United States Patent
Kandogan et al.

(10) Patent No.: US 8,095,524 B2
(45) Date of Patent: Jan. 10, 2012

(54) METHOD AND SYSTEM FOR INTEGRATING PERSONAL INFORMATION SEARCH AND INTERACTION ON WEB/DESKTOP APPLICATIONS

(75) Inventors: Eser Kandogan, Mountain View, CA (US); Seonho Kim, Dongdaemun-gu (KR)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 12/406,201

(22) Filed: Mar. 18, 2009

(65) Prior Publication Data

US 2010/0241645 A1 Sep. 23, 2010

(51) Int. Cl.
*G06F 7/00* (2006.01)
*G06F 17/30* (2006.01)
(52) U.S. Cl. .................. 707/705; 707/760; 707/784
(58) Field of Classification Search .................. None
See application file for complete search history.

(56) References Cited

U.S. PATENT DOCUMENTS

| | | | | |
|---|---|---|---|---|
| 5,442,780 | A * | 8/1995 | Takanashi et al. | 1/1 |
| 6,418,199 | B1 * | 7/2002 | Perrone | 379/88.01 |
| 6,601,055 | B1 * | 7/2003 | Roberts | 706/45 |
| 6,625,608 | B1 * | 9/2003 | Watanabe | 1/1 |
| 7,209,876 | B2 * | 4/2007 | Miller et al. | 704/9 |
| 2003/0093276 | A1 * | 5/2003 | Miller et al. | 704/257 |
| 2004/0139095 | A1 | 7/2004 | Trastour et al. | |
| 2005/0055628 | A1 | 3/2005 | Chen et al. | |
| 2006/0053154 | A1 * | 3/2006 | Yano | 707/102 |
| 2006/0074883 | A1 | 4/2006 | Teevan et al. | |
| 2006/0259480 | A1 | 11/2006 | Zhang et al. | |
| 2006/0271520 | A1 | 11/2006 | Ragan | |
| 2007/0088687 | A1 | 4/2007 | Bromm et al. | |
| 2007/0106497 | A1 | 5/2007 | Ramsey et al. | |
| 2007/0162907 | A1 | 7/2007 | Herlocker et al. | |
| 2007/0225969 | A1 | 9/2007 | Coffman et al. | |
| 2008/0033770 | A1 | 2/2008 | Barth et al. | |
| 2008/0243778 | A1 * | 10/2008 | Behnen et al. | 707/3 |
| 2008/0319947 | A1 * | 12/2008 | Latzina et al. | 707/3 |

OTHER PUBLICATIONS

Dong, et al., "A Platform for Personal Information Management and Integration," pp. 1-12.
Bostrom, F., "Personal Information Retrieval," pp. 1-12.
http://www.gmail.com.
http://mail.google.com/mail/help/intl/en/about.html.
http://download.live.com/.
http://www.salesforce.com/.
http://www.eudora.com/.
http://www.mozilla.com/en-US/firefox/.
http://www.microsoft.com.

* cited by examiner

*Primary Examiner* — Jay Morrison
(74) *Attorney, Agent, or Firm* — Gibb I.P. Law Firm, LLC

(57) ABSTRACT

A system for integrating personal information search and interaction on web and desktop applications comprises enabling a user-interface (UI) component of an application for the entry of a query the UI component associated with context information. Entry of the query based on a natural language grammar is parsed to determine at least one natural language element. Element types associated with each natural language element are generated. A query command from a command list based on the natural language elements, the element types and the context information is interpreted. The query with arguments based on the natural language elements of the natural language query are executed to determine a result. The transformed result is output through said UI component by replacing said result for said query wherein outputting said transformed result comprises automatically adding email addresses, attachments and maps to said UI component.

19 Claims, 14 Drawing Sheets

2400

| PATTERN | ACTION |
|---|---|
| <PERSON/NAME> w/2 <TELEPHONE/NUMBER> | ( INSERT(CONTACT.PERSON.NAME, $1); INSERT(CONTACT.PERSON.TEL, $2) ) |
| <PERSON/NAME> w/2 <EMAIL/ADDRESS> | ( INSERT(CONTACT.PERSON.NAME, $1); INSERT(CONTACT.PERSON.BUSINESS.EMAIL, $2) ) |
| . . . | . . . |
| ( (<PERSON/NAME> w/2 <POSITION/NAME>); Where (<PERSON/NAME> like "Smith") ) | UPDATE(CONTACT.PERSON.POSITION, $2) where CONTACT.PERSON/NAME like $1; |

METHOD AND SYSTEM FOR INTEGRATING PERSONAL INFORMATION SEARCH AND INTERACTION ON WEB/DESKTOP APPLICATIONS

BACKGROUND

1. Field of the Invention

The embodiments of the invention generally relate to information search, retrieval and integration.

2. Description of the Related Art

Knowledge workers spend significant time and effort in information interaction to complete every day tasks using conventional applications.

These knowledge workers typically need to switch to, search or invoke other applications to extract information related to a task at hand. A knowledge worker must engage with several applications in order to find and integrate information into the current application. For example, a knowledge worker must write a query to find the information using a search application. After executing the query, the result is then copied and pasted back into the email tool, travel web site or other application originating the task. In many cases the required information must be retrieved from web sites, databases, documents or other repositories. However, different applications and associated interaction mechanisms are typically used to search among the different repositories. Moreover, the format of query results from one application may require further processing before it can be used in the originating application.

For example, a list of customer names may be needed to send email only to customers found on the East Coast. The query results may need to be further constrained by filtering and applying transformations. For example, a query result may need to select only business email addresses in order to be consistent with the input text field of originating application (e.g. To: field in an email application.) In some cases, additional filtering and/or transformational steps may need to be performed by other applications, such as separating email addresses by comma in an email application.

However, these conventional approaches information search and retrieval suffer from a number of deficiencies. For example, conventional systems fail to integrate well with diverse information repositories. The multiple diverse information repositories are likely to require the mastery of a number of diverse interaction mechanisms. Thus, a knowledge worker is likely to be confronted with a different user interface for each repository. The concomitant cognitive load associated with mastering how to perform multiple searches with a number of different user interfaces inhibits fluid interaction and makes integration with everyday web applications difficult and increases the difficulty of reusing task-based context information.

Some conventional systems such as Enso attempt to address these issues by providing a command interpreter that can be launched on the desktop and perform actions on specific commands available within a number of different applications using the system clipboard. Enso also provides some extensibility by allowing users to add new vocabulary of actions. However Enso is limited to launching an application or performing a basic operation with specified parameters on the command line. Command syntax is limited and information is limited to what is provided by the target application.

Thus, a need exists for an easily extensible system for integrating personal information search and interaction into everyday applications on the desktop and web browsers.

SUMMARY OF INVENTION

The invention provides systems and methods to facilitate the fluid entry of an information query or task in pseudo-natural language within a user interface of a desktop or web application without switching to a search application. The query or task is performed through a stack of components that parse, generate, interpret, and execute the query/task with the query result replacing the original query in the originating application. The query utilizes the context of the task application. Thus, a query such as "sales associates in east coast" entered in a "To:" box of an email tool exploits the context of the query application and the associated text input UI component. The result is therefore constrained to return email addresses not names of the sales associates, for example. Similarly tasks performed within an email tool use the appropriate interpretation and execution that leverages the context. For example, an exemplary entry "attach sa 2007 presentations" constrains the results to match or expand to presentation files about the "sales associates" event for the year 2007.

The query parsing component uses a simple English language grammar, which can be extended through defined APIs. Query generation and interpretation utilizes data and types extracted from various web pages, file system, documents, and databases. In one embodiment, email addresses originate from the address book or contact list of the user. As Web pages are visited, extractors detect candidate updates to the user's address book based on identified name/email address information in the Web pages. The extracted information may be indexed for efficient query interpretation based on value and type match information.

In various embodiments, an API is available to extend the task/query language. For example, users can easily define a "send email" task with a syntax of the form "send <File/Name> to <Person/Email>." The value matches such as partial matches to File/Name, and type conversions, such as Person/Name to Person/Email, are handled automatically. The user extended terms are dynamically associated with application and/or operating system commands.

The query is interpreted by matching against a command repository associating commands with user-defined commands with the application and/or operating system commands. The application context and data types are used to match the commands and one or more candidate data elements. The candidate data can be further transformed to fully resolve the arguments based on information in the personal information repository. The fully resolved command and arguments are executed as a query. The query result is then substituted into the target UI component of the originating application.

A system for integrating personal information search and interaction on web and desktop applications comprises enabling a user-interface (UI) component of an application for the entry of a query the UI component associated with context information. Entry of the query based on a natural language grammar is parsed to determine at least one natural language element. Element types associated with each natural language element are generated. A query command from a command list based on the natural language elements, the element types and the context information is interpreted. The query with arguments based on the natural language elements of the natural language query are executed to determine a result. The transformed result is output through said UI component by replacing said result for said query wherein outputting said transformed result comprises automatically adding email addresses, attachments and maps to said UI component.

BRIEF DESCRIPTION OF THE SEVERAL VIEWS OF THE DRAWINGS

The embodiments of the invention will be better understood from the following detailed description with reference to the drawings, which are not necessarily drawing to scale and in which:

FIG. 3 is an exemplary data structure for storing user preference information according to an aspect of this invention;

DETAILED DESCRIPTION

As mentioned above, there remains a need for systems and methods of personal information search and integration.

Thus, the embodiments of the invention and the various features and advantageous details thereof are explained more fully with reference to the non-limiting embodiments that are illustrated in the accompanying drawings and detailed in the following description.

Figure 1:
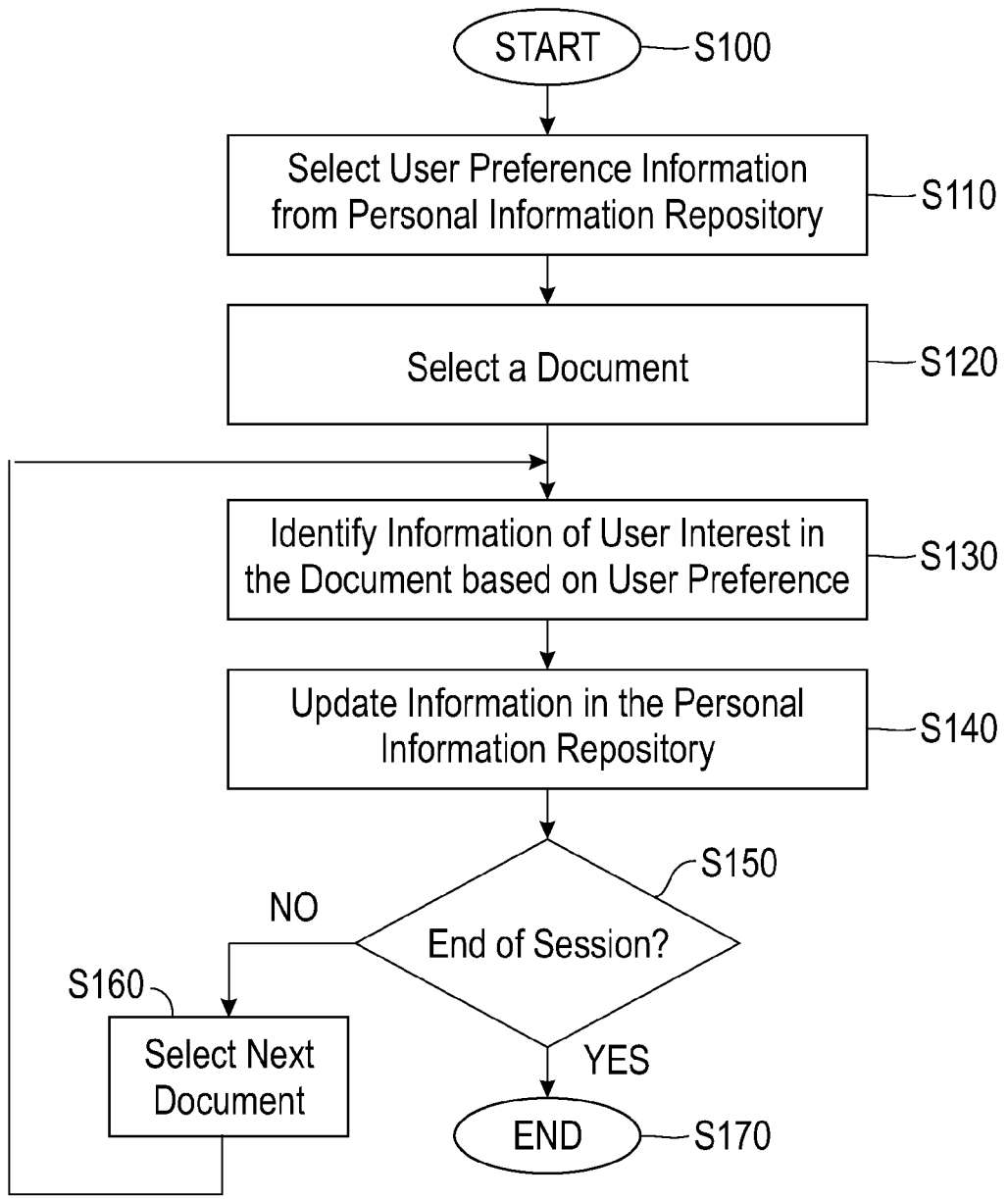
FIG. 1 is an exemplary method of updating personal information according to an aspect of this invention.

FIG. 1 is an exemplary method of updating personal information according to an aspect of this invention. The process begins at step S100 and immediately continues to step S110 where the user preference information is selected. In various exemplary embodiments according to this invention, the user preference information is entered directly by the user, retrieved from memory or retrieved from a storage device or the like. The user preference information contains information indicating the conditions under which information within the personal information repository is updated. The information may include address information, accomplishments and/or information about items of interest to the user. Items of interest may include, but are not limited to, people, organizations events and the like. Once the user preference information has been selected, control continues to step S120.

A document is selected in step S120. In various exemplary embodiments, the document reflects a page or document retrieved or accessed by the user during the course of a task. That is, the document need not be intentionally retrieved by the user in order to update the personal information repository. For example, authors collaborating on a paper can, using embodiments of the invention, update their personal information repositories by reviewing each other's web pages perhaps incidentally, as the result of a review for relevant citation information for the paper. Similarly, the passive review of a colleague's home page or web page document also provides an opportunity for retrieving and updating relevant information about the colleague from the personal information repository. Once the document is selected, control continues to step S130 where information of interest to the user is identified based on the determined user preference information.

Thus, in one exemplary embodiment according to this invention, an extractor identifies potential information of interest to the user within a retrieved document. Extractors identify and extract, telephone numbers, addresses or other named entities within a document and associate the information with an entity. Entities may be persons, organizations or the like. After the information of interest has been identified and extracted, control continues to step S140.

In step S140, the information in the personal information repository is updated based on the information of interest to the user. In one exemplary embodiment according to this invention, a rule is used to define the conditions under which information is to be updated. Matches are then performed against a permission field indicating whether the user has granted permission to update the relevant information in the personal information repository. Once permission is verified, the information of interest to the user is used to update the relevant information within the user's personal information repository. After the update, control continues to step S150.

A determination is made in step S150 as to whether an end of session has been initiated by the user or by the system. The user may end the session by closing the application, selecting a menu item or the like. If it is determined in step S150 that an end of session has not been initiated, control continues to step S160 where the next document is selected. After step S160, control then jumps to S130. Steps S130-S150 then repeat until it is determined in step S150 that an end of session has been indicated at which time control continues to step S170 and the process ends.

Figure 2:
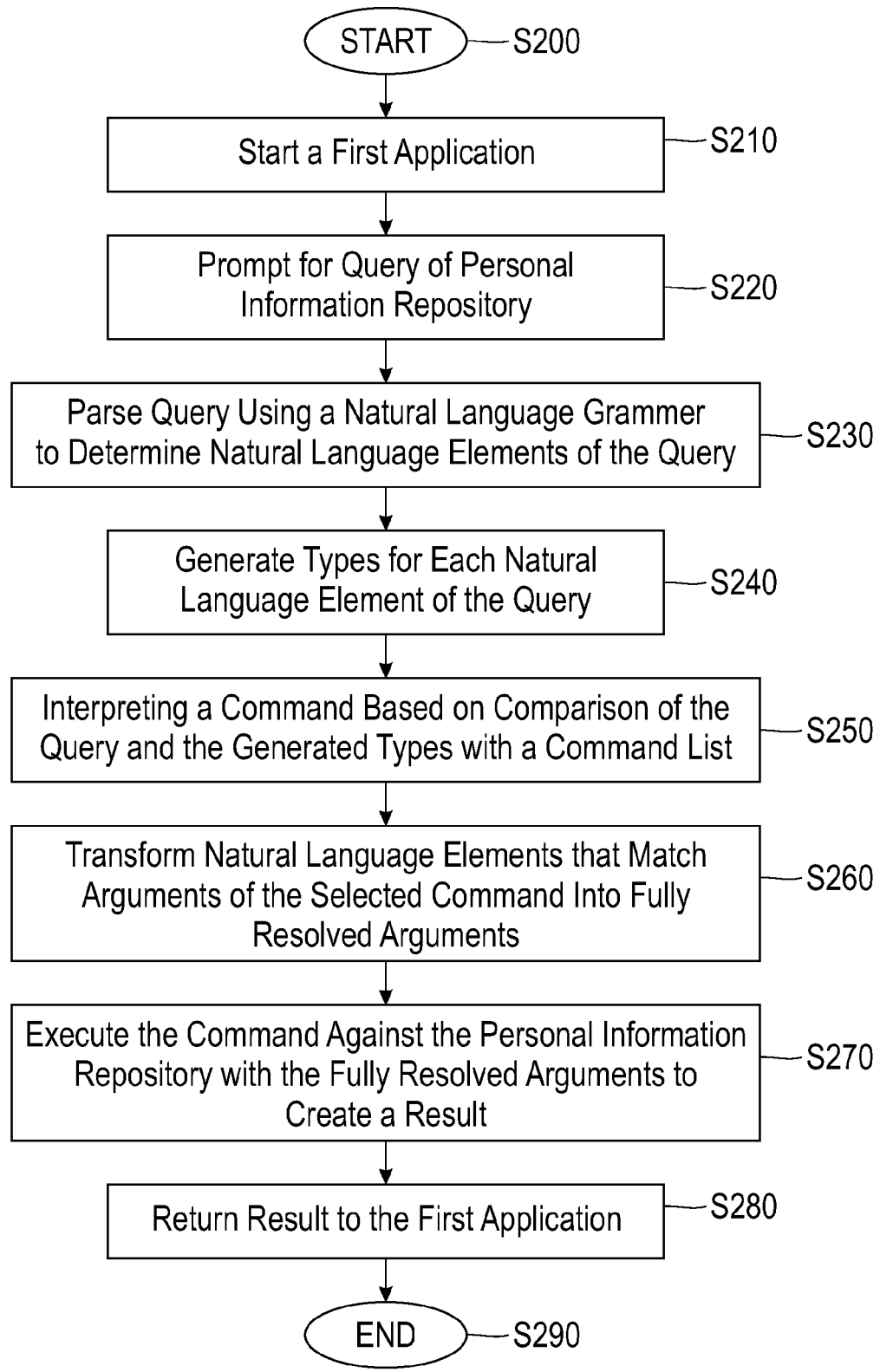
FIG. 2 is an exemplary method for integrating personal information search and interaction according to an aspect of this invention.

FIG. 2 is an exemplary method for integrating personal information search and interaction according to an aspect of this invention. The process begins at step S200 and immediately continues to step S210 where the user selects a first application.

The application may be a Web-based application such as Gmail (available from www.gmail.com, described at http://mail.google.com/mail/help/intl/en/about.html), Windows Live (available at http://download.live.com/, from Microsoft Corporation, located in Redmond, Wash., USA), salesforce.com (available at htttp://www.salesforce.com/, from Salesforce.com Inc., San Francisco, Calif. USA), or desktop based applications like Eudora (available at http://www.eudora.com from QUALCOMM Corporation, San Diego, Calif. USA), Firefox (available at http://www.mozilla.cm/en-US/firefox/, from Mozilla Corporation/Mozilla Foundation, Mountain View, Calif. USA), Outlook (available at www.microsoft.com from Microsoft Corporation) or the like.

In one exemplary embodiment, according to this invention, the first application is selected by a cursor exceeding a dwell time associated with a user-interface (UI) component in the first application or clicking in the window associated with the first application. However, it will be apparent that various other implicit or explicit method of selecting the first application may also be used in the practice of this invention. Once the first application has been selected, control continues to step S220.

In step S220, a prompt for the query of the personal information repository is initiated. In one exemplary embodiment according to this invention, the first application natively requests relevant information through a user interface component such as a text input box or the like. A hook into the operating system allows application initiated requests for information to be intercepted by natural language components of this invention. Thus, for example, when the user presses the an attention key such as the "ESC" key within the addressee "To:" field of an email application, subsequently entered natural language information is passed directly to the natural language components of the system for integrating personal information search and interaction. The following string up to a submit key (like the "ENTER" key) forms the natural language query. After the user's natural language query has been submitted, control continues to step S230.

The natural language query is parsed using a natural language grammar to determine the natural language elements of the query in step S230. That is, the parts of speech and other natural language elements of the natural language query are determined. After the natural language query has been determined, control continues to step S240.

In step S240 types are generated for each element of the natural language query. Thus, for the natural language element "Kim" the corresponding type is <Person/Name>. Another type might be <File/Name>. After the type of each element has been determined, control continues to step S250 where a command is selected based on a comparison of the query and the generated types with a command list.

The command list contains synonym terms such as "send", "email" "forward" and other terms equating with the user's particular email application. The command list also contains information indicating the relevant "type" associated with each required and or optional command argument. The type information indicates the types of information that can be substituted for a required or optional command argument. The sequence or pattern of command "type" information further disambiguates the command indicated by the natural language query. Control then continues to step S260.

In step S260, the natural language elements that match the arguments of the selected command are resolved. That is, if necessary, the relative paths are resolved into fully resolved paths based on the context of the invocation. Thus, in one exemplary embodiment, a user's prior actions on "presentation_144" within directory "project_4" on the c: drive of their personal computer results in a suggested file context of "c:\project_4." The file context is useful for resolving relative references to the file "presentation_144" into a fully resolved filename of "c:\project_4\presentation_144". The file context information is useful in resolving any potential ambiguities with similarly named files within the user's personal information repository. After the natural language elements have been resolved, control continues to step S270.

The command and fully resolved arguments are executed against the personal information repository to create a result in step S270. The results of the executed command or query are then returned as the query result. After the query command has been executed, control continues to step S280.

In step S280, the query result is then returned to the text box or UI component of the first application. The query result matches the content of the UI component. After the query result is returned, control then continues to step S290 and the process ends.

FIG. 3 is an exemplary data structure for storing user preference information according to an aspect of this invention. The exemplary data structure for storing user preference information 2400 is comprised of a pattern portion 2410 and an action portion 2420. However, various other ways of encoding the information may also be used without departing from the spirit or scope of this invention.

The first row of the exemplary data structure for storing user preference information 2400 contains the value "<PERSON/NAME>w/2<TELEPHONE/NUMBER> within the pattern portion 2410. This indicates the ordering and proximity can be set by the user or set programmatically without departing from the spirit or scope of the invention.

The action portion 2420 of the first row of the exemplary data structure for storing user preference information 2400 contains the value "(insert(CONTACT.PERSON.NAME, $1); insert(CONTACT.PERSON.TEL, $2))." This entry indicates the actions performed when the pattern portion matches an element of the current document. Thus, if a portion of the current document contains name and telephone number information, the extracted name and telephone number information is added to the contact information in the user's personal information repository.

The second row of the exemplary data structure for storing user preference information contains the value "<PERSON/NAME>w/2<EMAIL/ADDRESS>" within the pattern portion 2410. This indicates the type of information necessary to trigger the action contained in the action portion.

The action portion 2420 of the second row of the exemplary data structure for storing user preference information 2400 contains the value "(insert(CONTACT.PERSON.NAME, $1); insert(CONTACT.PERSON.BUSINESS.EMAIL, $2))." This indicates that the name and email address information will be inserted into the user's contact information. This allows the user to collect name and email address information by simply browsing the information of interest. In various other exemplary embodiments according to this information, the user is prompted to explicitly confirm the storage of the identified name and email address information.

The last row of the exemplary data structure for storing user preference information 2400 contains the compound matching pattern "((<PERSON/NAME>w/2<POSITION/NAME>); where (<PERSON/NAME>like "Smith"))." This indicates that the pattern will match when the name and position information conform to the indicated pattern and where the identified name contains the string "Smith". When the specified pattern is matched, the action portion 2420 "update(CONTACT.PERSON.POSITION, $2) where ((CONTACT.PERSON.NAME like $1) && (CONTACT.PERSON.POSITION==UPDATEABLE))" is executed. This updates the user contact information or address book containing "Smith" in the Name field with the position information extracted from the document but only if the user position information is marked as "UPDATEABLE" for dynamic updates. In this way, the user's personal information repository is maintained with a minimum of user effort.

Figure 4:
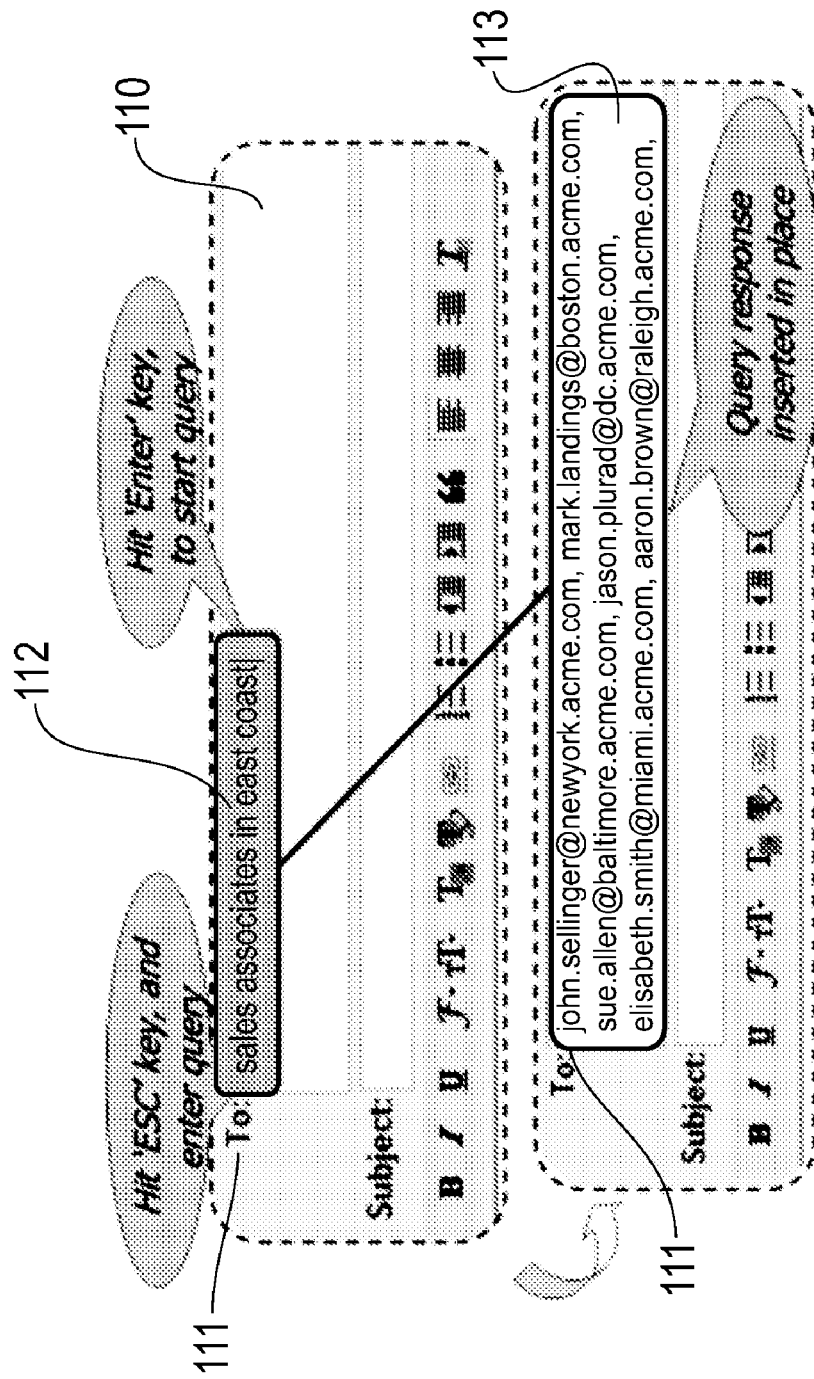
FIG. 4 shows a first exemplary information search and integration within an application according to an aspect of this invention.

FIG. 4 shows a first exemplary search interaction within an application according to an aspect of this invention. A first window 110 contains a text input box user interface component 111 associated with the To: field of an email application. In this exemplary embodiment, a mouse-over type of user-interaction triggers the display of a balloon help window. The balloon help window indicates that a natural language query such as may be entered by pressing the "ESC" key. After the "ESC" key has been pressed, the user enters a natural language query such as "sales associates in east coast." In response to pressing a submit or execute key such as "Enter", the system for integrating personal information search and interaction processes the natural language query. The query results 113 are then returned and inserted into the text input box UI component 111 associated with the To: field of the email application.

Figure 5:
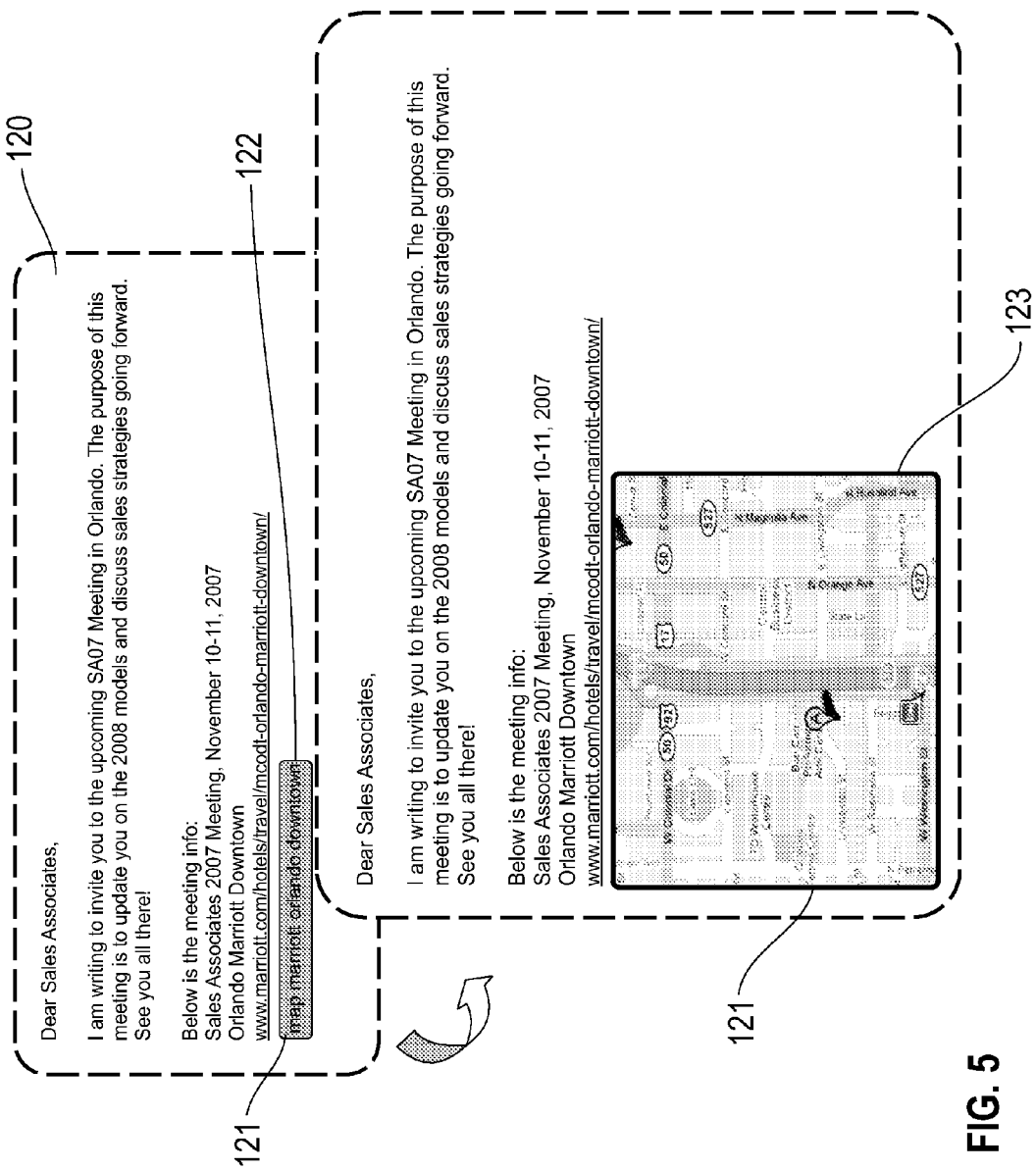
FIG. 5 shows a second exemplary information search and integration within an application according to an aspect of this invention.

FIG. 5 shows a second exemplary search interaction within an application according to an aspect of this invention. An editor is used to compose a message to be emailed to a mailing list of Sales Associates. The user inserts a natural language query by pressing the "ESC" or attention key and entering the natural language query 122, "map Marriott Orlando downtown" into the general text entry box of the UI component 121. In response, the system for integrating personal information search and interaction retrieves the relevant map of the Orlando Downtown Marriot Hotel from a mapping application. The relevant map is then substituted for the results of the original natural language query 122. This allows the user to remain focused on the letter writing task rather than re-focusing their attention on launching a mapping application, explicitly retrieving the map and inserting the map into the email message.

Figure 6:
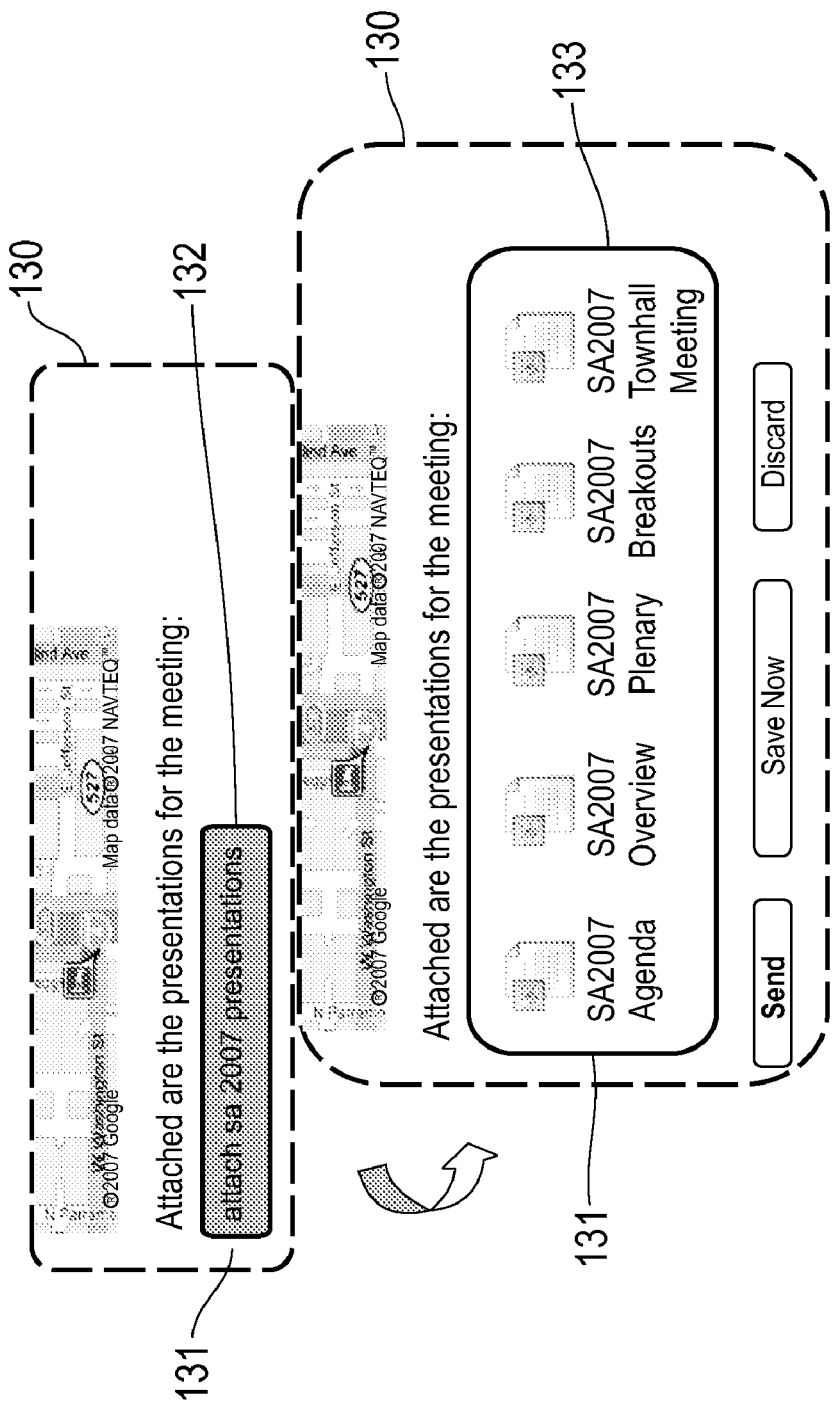
FIG. 6 shows a third exemplary information search and integration within an application according to an aspect of this invention.

FIG. 6 shows a third exemplary search interaction within an application according to an aspect of this invention. The text input box UI component 131 of the email application 130 accepts the "ESC" key signaling the entry of the natural language query 132 "attach sa 2007 presentations". The system for integrating personal information search and interaction then executes the query and returns the query result 133. In one exemplary embodiment, the query result is returned as a set of 5 presentation documents containing the terms "SA 2007." However, in one embodiment, candidate query results are presented to the user. The user then selects one or more candidate results as the query result. The query result is then attached to the email message. This minimizes the cognitive load on the user.

Figure 7:
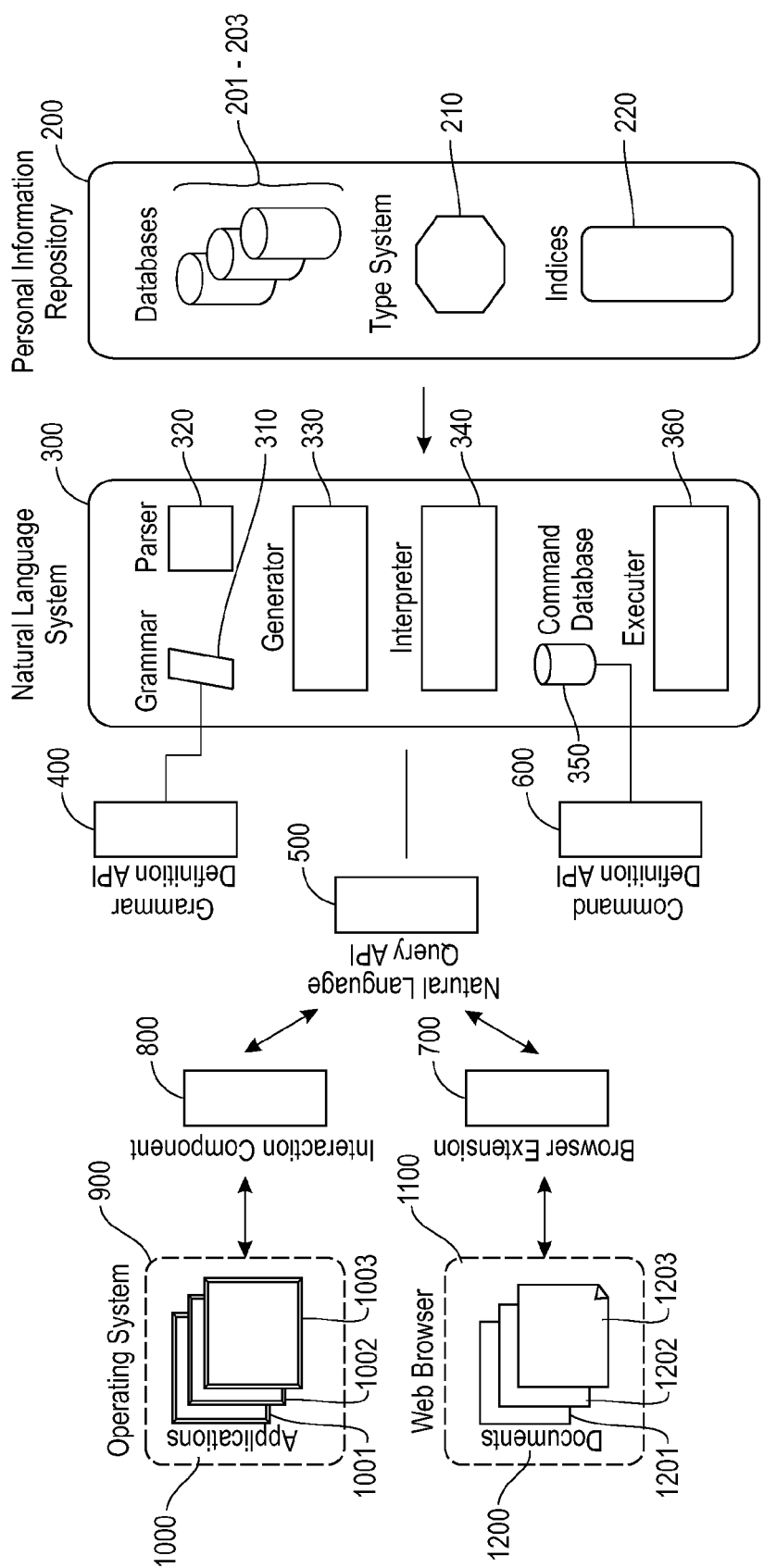
FIG. 7 is an overview of a system for personal information search and integration according to an aspect of this invention.

FIG. 7 is an overview of a system for integrating personal information search and interaction according to an aspect of this invention. The operating system 900 enables the execution of applications 1000-1003. The interaction components 800 facilitate the re-direction of application specific user interface interactions to the natural language query API 500. A browser extension 700 facilitates extraction of user interest information from documents 1200-1203 and update of the information within a user's personal information repository 200.

The system for integrating personal information search and interaction extracts natural language queries entered into the interaction components 800 of various applications 1000 executing within an operating system 900. Parts of speech and other natural language elements of the natural language query are determined by the parser 320 based on a natural language grammar 310. The generator 330 then determines the types of each identified natural language element. The interpreter 340 selects a command from the command database 350 based on strings associated with the command the arguments and the type information associated with the commands and each natural language element in the query. The executer 360 transforms any relative paths of the arguments into absolute or fully qualified arguments. The executer then executes the identified command with the resolved argument list. The result of the executed query is then returned to the interaction component 800 initiating the natural language query.

Figure 8:
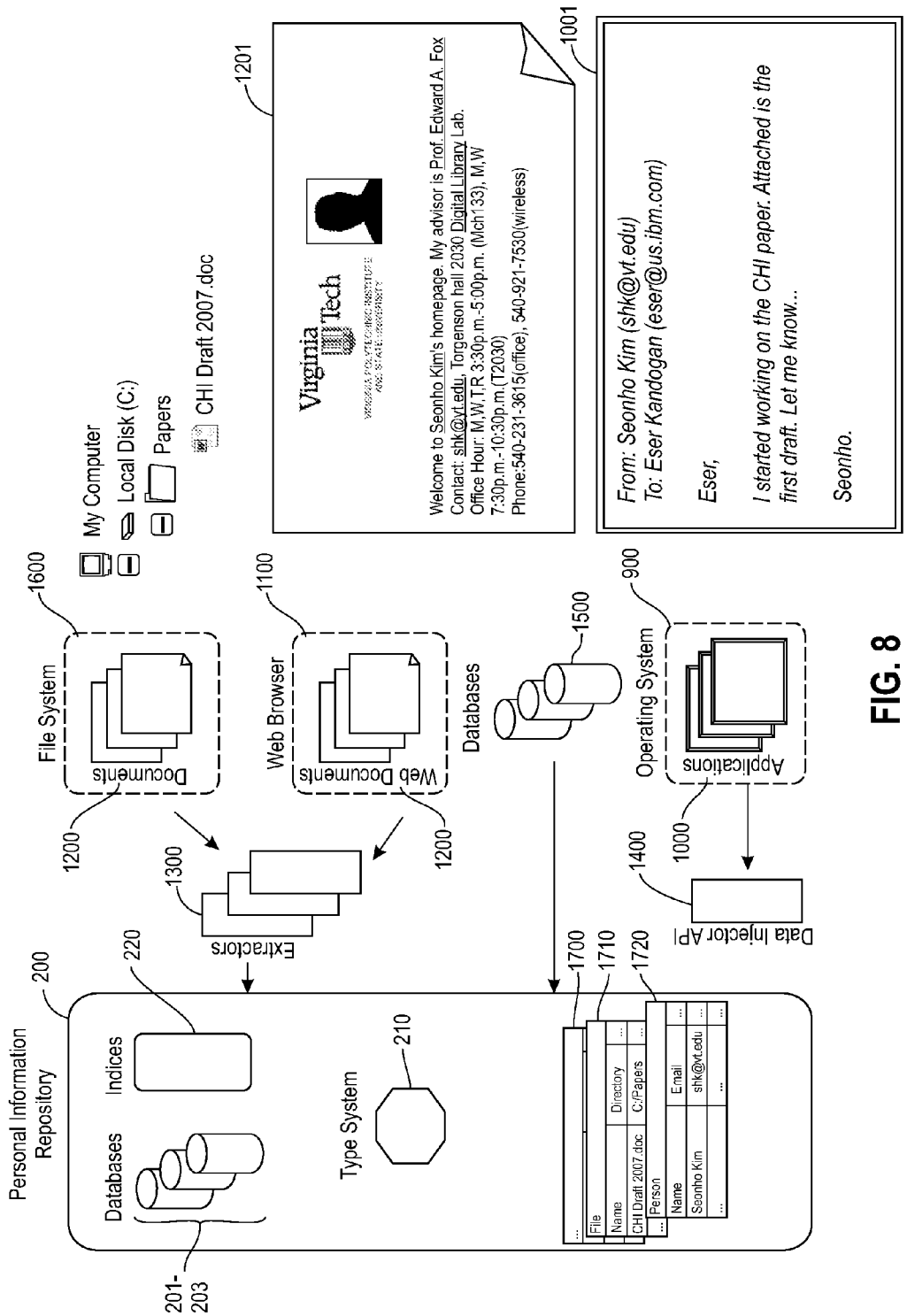
FIG. 8 is an overview of the update of personal information according to an aspect of this invention.

FIG. 8 is an overview of the update of personal information according to an aspect of this invention. An exemplary overall architecture of the system for integrating personal information search and interaction comprises: a personal information repository; a user interaction component; and a natural language component.

In various exemplary embodiments according to this invention, the personal information repository is comprised of database tables, indices, and a type system. The databases are populated with information mainly from: the file system; documents; Web documents; local databases; the operation system and from applications. However, other sources of information can also be integrated without departing from the spirit or scope of this invention.

In one exemplary system for integrating personal information search and interaction, an initialization process scans each document on the client file system to populate the database with information detected using one or more Extractors. Extractors identify and extract information of interest to the user within the documents. As these documents are accessed, the new information is processed and ranked according to recency. Similarly, as users browse the web via a web browser, a web extension reads the document object model (DOM) of the web document, identifies information of interest to the user. The information is then extracted and used to populate and/or update the personal information repository. Information from databases and applications is automatically extracted and/or a data injection API used to insert new information into the personal information repository.

When the various relevant extractors detect new or updated information, the identified information is inserted into tables within the relevant databases or other information store. A re-index of the relevant database, files systems, browsed documents and/or other repository is scheduled. The updated and/or new information becomes available to the system for integrating personal information search and interaction once the re-index of the relevant repository is complete.

Thus, as a user browses an individual's homepage, the individual's name and email address information is extracted from the web page. In one exemplary embodiment, extracted name and email information is inserted into a Person table of the Personal Information Repository.

Figure 9:
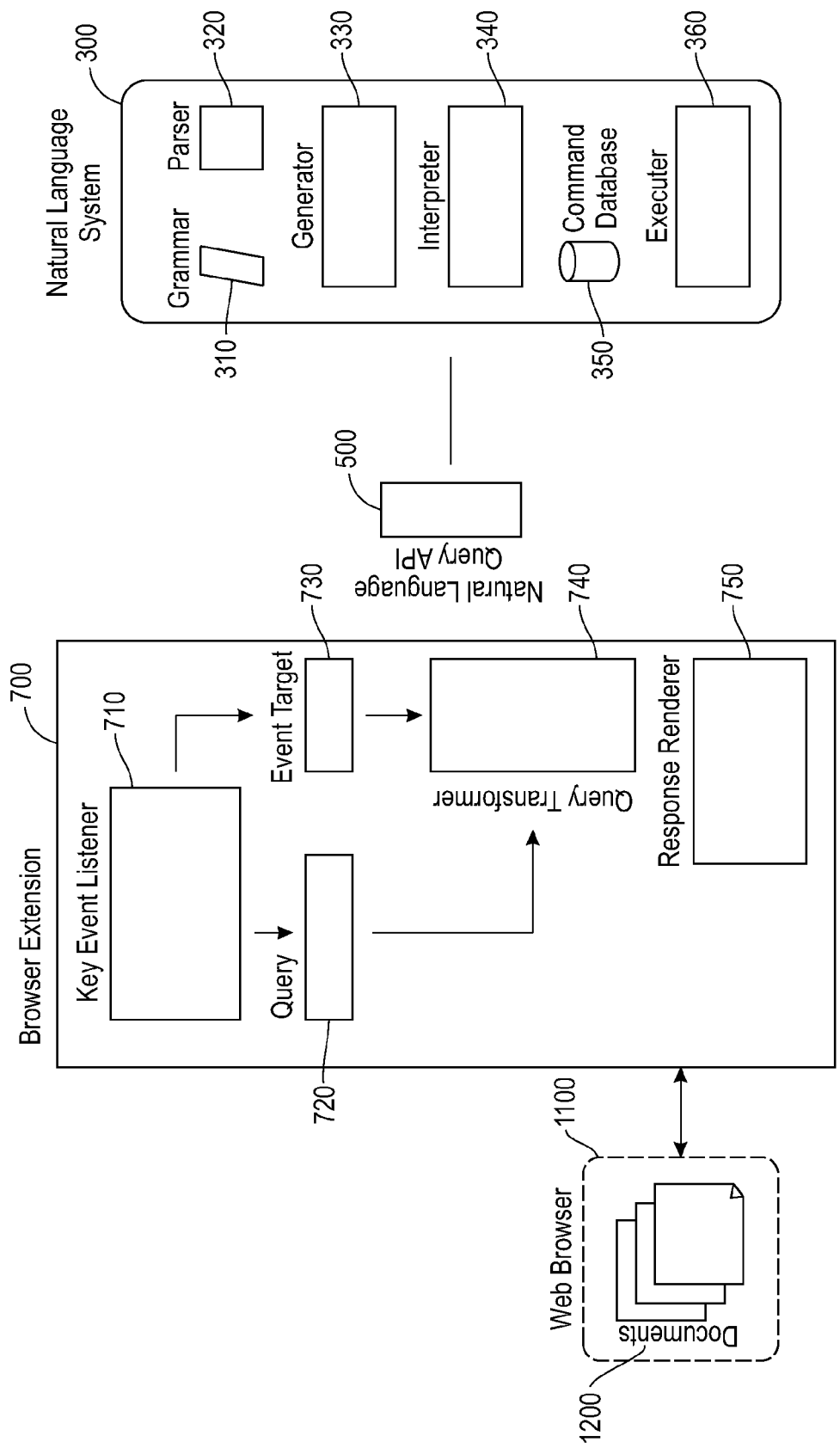
FIG. 9 is an overview of a browser extension component according to an aspect of this invention.

FIG. 9 is an overview of a browser extension component according to an aspect of this invention. The user interaction component is usable by web and desktop applications. The UI component for web applications comprises a web browser extension that monitors each web document and registers a listener to track all key events at the document level. When an attention key code or sequence is entered by the user, the web browser extension enters a Capture mode. Subsequent keystrokes entered in the user interface component currently in focus are saved until a second key code or key sequence is entered signaling the submission or execution of the query. The captured key codes are prevented from trickling down the document hierarchy and default actions on the keys are prevented.

In one exemplary embodiment according to this invention, keys entered during the capture mode are rendered in the target UI component with an accentuating display characteristic. For example, in one embodiment, bolding or italics is used to highlight user entered information. When the submit or "Enter" key is entered, the query and associated event target is sent to a query transformer which transforms the query based on the current context of the application. Thus, in one embodiment, the entry of a natural language query in the "To:" field of an email application provides context to the system for integrating personal information search and interaction that is used to apply constraints on the possible interpretation of the natural language query. In various exemplary embodiments according to this invention, the results of a query in the "To:" field of the email application will be restricted to valid entries in the "To:" field such as valid email address, group lists and the like. Similarly, a natural language query in a "Date:" field will be constrained to return results with a "Date: type.

A query transformer communicates the natural language query to the natural language component. In one exemplary embodiment, the natural language query is communicated via a natural language query application program interface or API. When the natural language result is returned to the originating application, it is handled by the response renderer, which renders the result back in the originating target web object, replacing the natural language query with the query result. Depending on the type of originating web object, the response can be text, graphics, or any HTML component requiring further user interaction. The natural language component transforms the natural language query in a parsing stage; a generation stage; an interpretation stage; and an execution stage.

Figure 10:
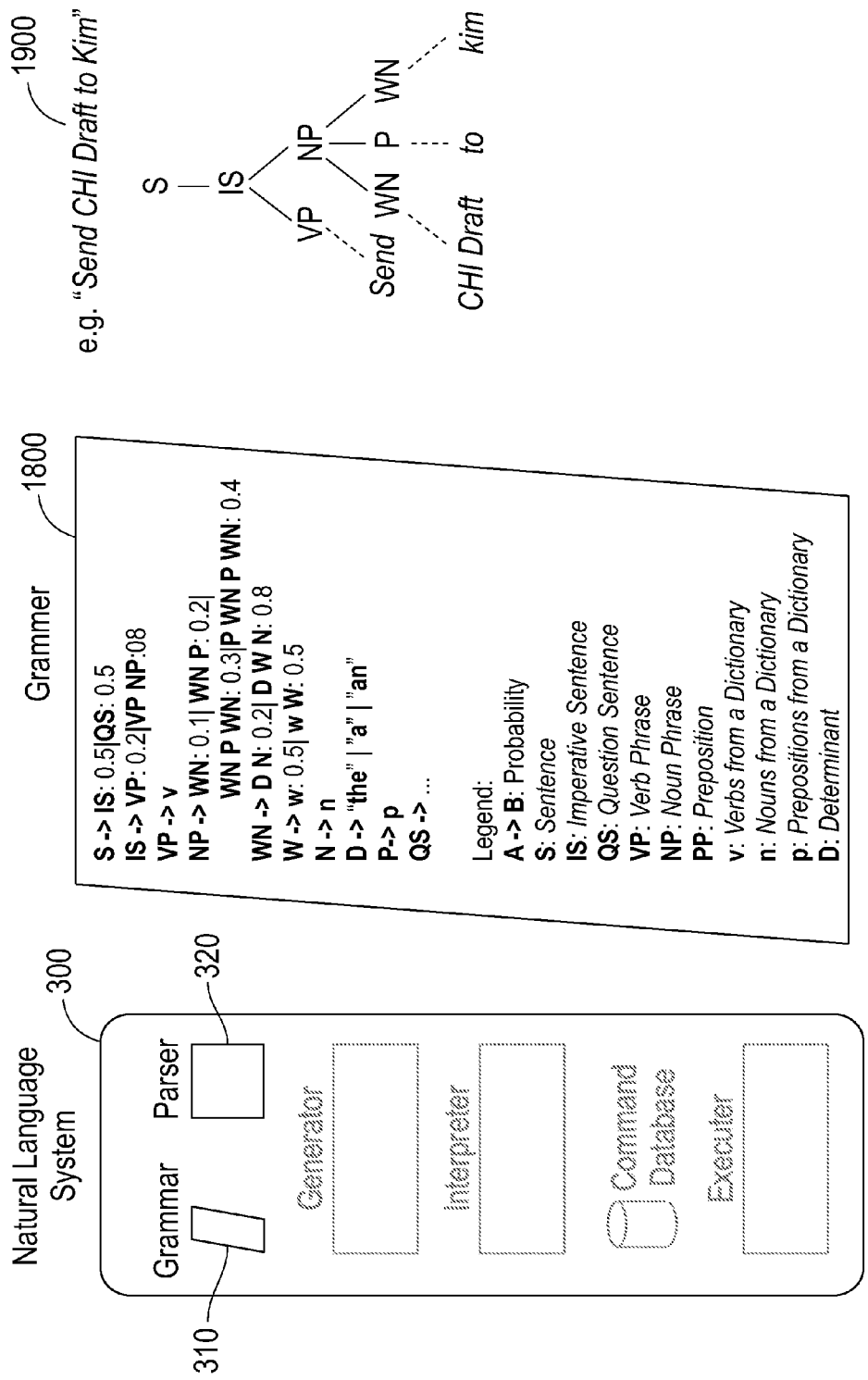
FIG. 10 shows the exemplary parsing of an exemplary natural language query using a natural language grammar to determine natural language elements of the query according to an aspect of this invention.

FIG. 10 shows an exemplary parsing stage according to an aspect of this invention. In the parsing stage, a syntactic analysis of the natural language command is performed. In this first stage, natural language elements such as verbs, nouns, prepositions, etc. are identified to help in forming association of words in a subsequent generation phase. Typically the grammar used in the parser avoids application specific semantics. This facilitates use by multiple applications. In one exemplary embodiment, a chart parser is used which handles ambiguity in the grammar which is typical in natural language. An exemplary grammar is as follows:

```
Sentence -> ImperativeSentence 0.5 | QuestionSentence 0.5
ImperativeSentence -> VerbPhrase 0.1 | VerbPhrase PrepositionPhrase 0.25 |
VerbPhrase NounPhrase 0.25 | VerbPhrase NounPhrase P NounPhrase 0.4
VerbPhrase -> V 0.4 | Words V 0.6
PrepositionPhrase -> P NounPhrase 1.0
NounPhrase -> CompoundNoun 0.4 | CompoundNoun
PrepositionPhrase 0.6
CompoundNoun -> N 0.2 | D N 0.3 | D Words N 0.5
Words -> W 0.25 | W Words 0.75
...
```

As can be seen from this exemplary grammar, multiple possible matches may be returned by the parser. For each possible match, a rank is calculated by the multiplication of the associated rules utilized. The parse tree 1900 for the natural language query "Send CHI Draft to Kim" is shown in FIG. 10.

Figure 11:
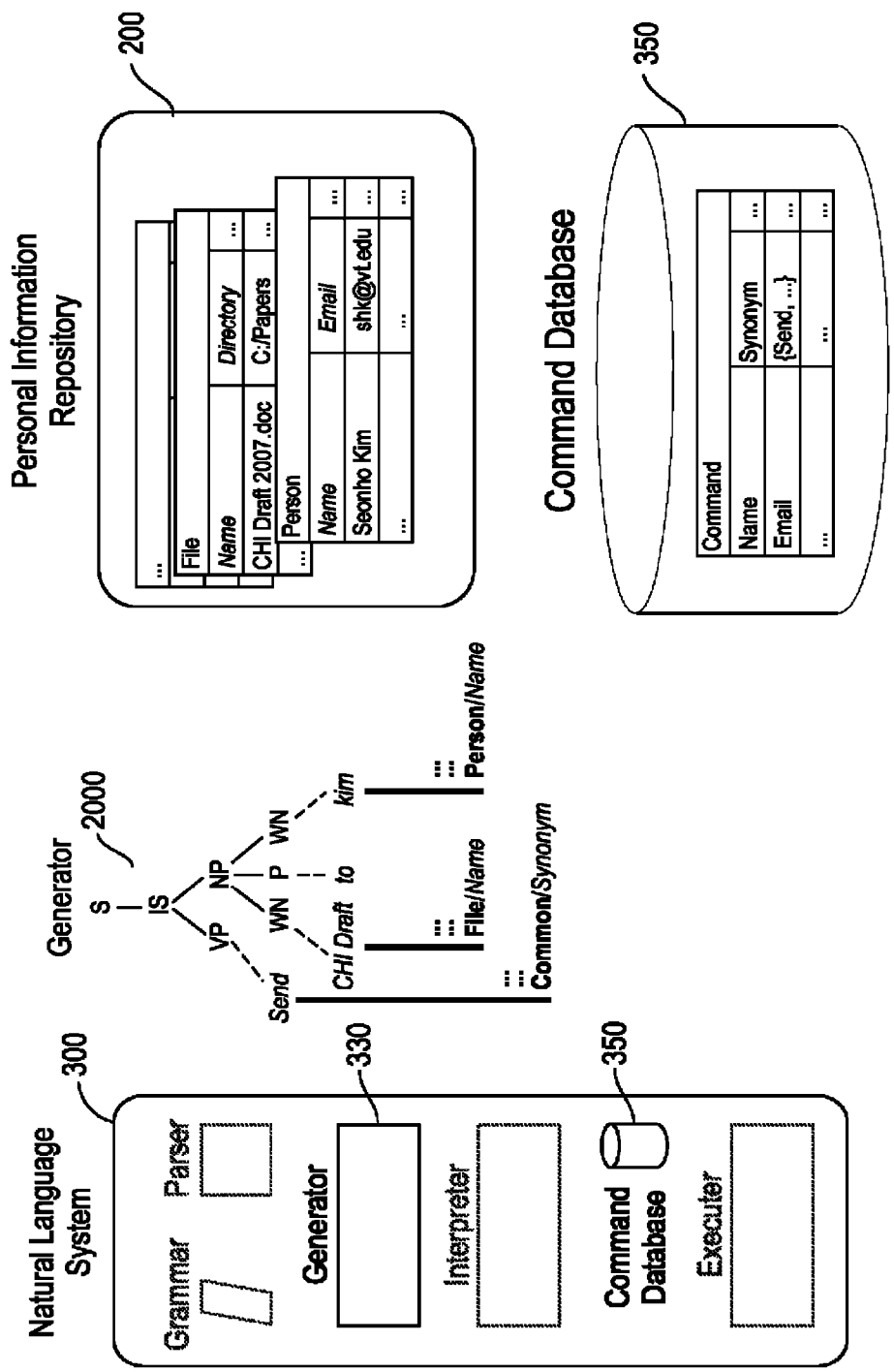
FIG. 11 shows the exemplary generation of types for each natural language element of the query according to an aspect of this invention.

FIG. 11 shows the exemplary generation stage according to an aspect of this invention. In the generation stage, associated types for each of the marked natural language element are calculated. Essentially, when the grammar is defined certain rules are marked where the left hand side (LHS) or pattern portion is said to be of interest, such as a verb ("V") or a compound noun. In the above example, these are "Send", "CHI Draft", "to", and "Kim". Each such element is checked against the repository indices for any value matches. For example, the natural language element "CHI Draft" partially matches a row in the File table on the Name column. Thus, <File/Name> is added as a possible type match. Likewise for "Kim" a <Person/Name>match is added.

Given the nature of the words, there could be many matches for each marked language element. Note that this step is done for each marked language element, independently. The generation stage or component may also utilize annotators to generate type information. In cases where an annotator generates the type information, a value match is not necessary. For example, "408-927 1949" is a type match (for */PhoneNumber) based on format information defined within an annotator. The generator may also expand the possible type match by examining possible type derivations. Data relationships and links can sometimes be exploited to derive the required type information. For example, <Person/Email> can be derived from <Person/Name>.

Figure 12:
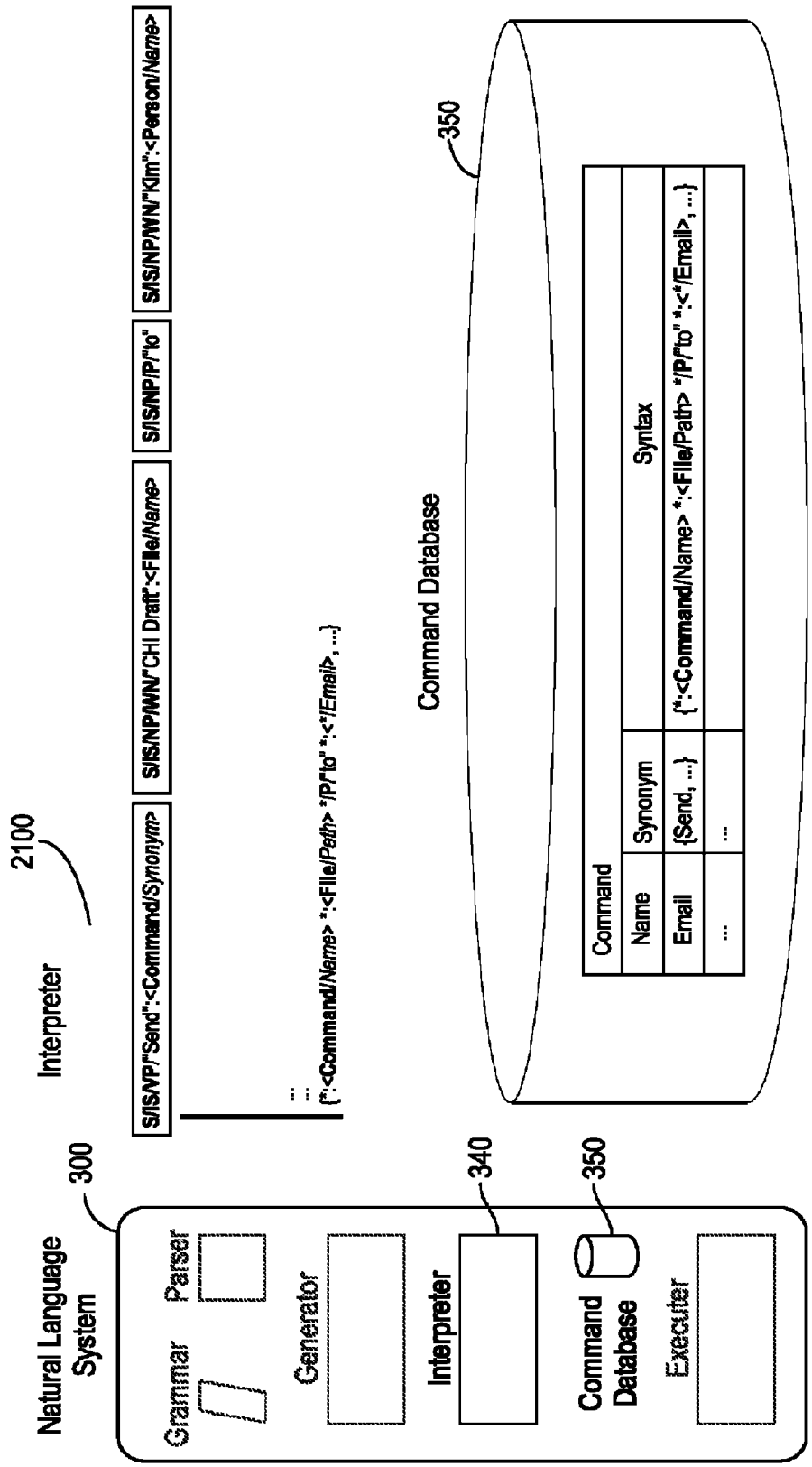
FIG. 12 shows the exemplary interpretation or selection of a command according to an aspect of this invention.

FIG. 12 shows the exemplary interpretation stage according to an aspect of this invention. After possible type matches are generated for each marked language element, the complete sentence is examined against possible matches to the various command syntax identified in the command database in the interpreter stage. The command syntax is essentially a sequence of path:type definitions where path determines the location of the element in the sentence and type determines the type match in the existing databases. Thus, "CHI Draft" is matched to path S/IS/NPIWN and type <File/Name>. When the whole sentence is considered, it is a possible match for the Email command with a syntax of {*:<Command/Name>*: <File/Path>*/P/"to"*:<*/Email>}, where "Send" is a match for a command name independent of the parse tree hierarchy, "CHI draft" is a possible match for File/Path (with derivation) likewise independent of the parse tree hierarchy, "to" is a match for a preposition anywhere in the parse tree, and "Kim" is a possible match (with derivation) for an Email attribute of any table.

In one exemplary embodiment, the path is expressed in XPath, which allows developers to define complex syntax where syntax can also check for parent and sibling matches. For example, the XPath can be used to enforce a rule that a Person/Name must precede the preposition "to" for a match to occur. At the end of the interpretation phase there could be a number of matching commands. In the case of a number of matches, the user may be requested to select the desired interpretation.

Figure 13:
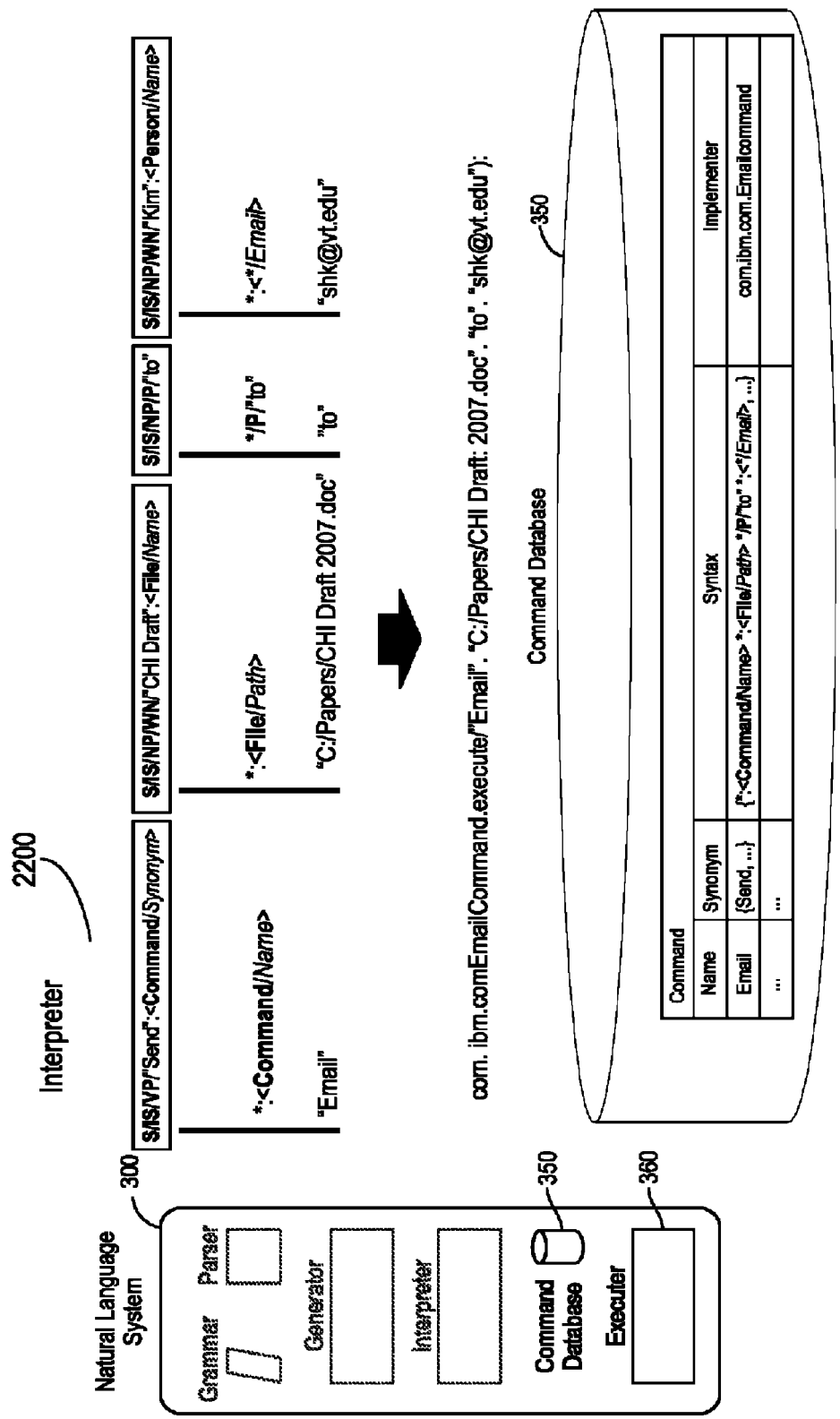
FIG. 13 shows an exemplary execution of the selected command according to an aspect of this invention.

FIG. 13 shows an exemplary execution stage according to an aspect of this invention. In the execution stage, the type transformations are made and the execute method of the implementing class is called with the transformed types as parameters. For example, in the above case "CHI Draft" is transformed to "C:/Papers/CHI Draft 2007.doc" and "Kim" to "shk@vt.edu".

The embodiments of the invention can take the form of an entirely hardware embodiment, an entirely software embodiment or an embodiment including both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 14:
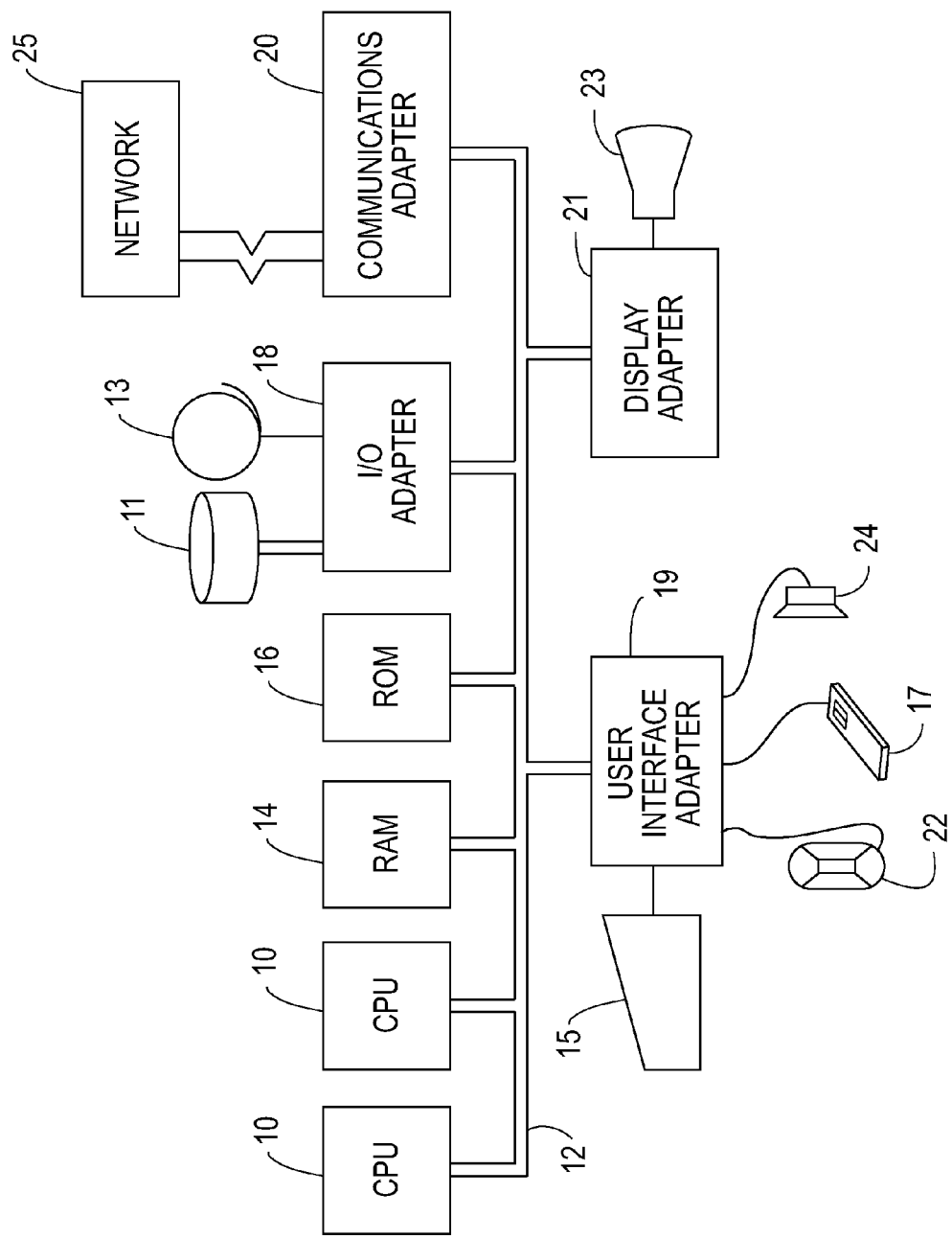
FIG. 14 is a schematic diagram illustrating an exemplary hardware environment that can be used to implement the embodiments of the invention.

A representative hardware environment for practicing the embodiments of the invention is depicted in FIG. 14. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system.

The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the corresponding structures, materials, acts, and equivalents of all means or step plus function elements in the claims below are intended to include any structure, material, or act for performing the function in combination with other claimed elements as specifically claimed. Additionally, it should be understood that the above-description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. Well-known components and processing techniques are omitted in the above-description so as to not unnecessarily obscure the embodiments of the invention.

Finally, it should also be understood that the terminology used in the above-description is for the purpose of describing particular embodiments only and is not intended to be limiting of the invention. For example, as used herein, the singular forms "a", "an" and "the" are intended to include the plural forms as well, unless the context clearly indicates otherwise. Furthermore, as used herein, the terms "comprises", "comprising," and/or "incorporating" when used in this specification, specify the presence of stated features, integers, steps, operations, elements, and/or components, but do not preclude the presence or addition of one or more other features, integers, steps, operations, elements, components, and/or groups thereof.

The invention claimed is:

1. A computer-implemented method for integrating personal information search and interaction on web and desktop applications comprising:
   enabling, by an information handling/computer system, a user-interface (UI) component of an application to enter a query of a personal information repository, based on a request for information by said UI component;
   in response to said request, receiving natural language information that is entered into said information handling/computer system;
   parsing, by said information handling/computer system, said natural language information based on a natural language grammar, to determine at least one natural language element;
   generating, by said information handling/computer system, element types associated with each of said at least one natural language element;
   selecting, by said information handling/computer system, a command from a command list based on matching arguments of said command to said element types and type information that indicates those element types that substitute for said arguments;
   executing, by said information handling/computer system, said command based on said matching arguments to determine a result from said personal information repository to said query;
   outputting, by said information handling/computer system, said result through said UI component by replacing said result for said request for information by said UI component to automatically add any of email addresses, attachments, and maps to said UI component.

2. The method of claim 1, wherein said result is based on a context of said UI component.

3. The method of claim 2, wherein said result is transformed based on information contained within said personal information repository.

4. The method of claim 1, wherein said UI component of said application is not directed to search.

5. The method of claim 1, wherein said parsing of said natural language information is based on a chart parser.

6. The method of claim 1, wherein said element types are based on parts of speech.

7. The method of claim 1, wherein said arguments are resolved based on information from said personal information repository.

8. The method of claim 1, wherein said element types are based on information from a plurality of information repositories.

9. The method of claim 1, wherein said result comprises interpretations ranked by recency of observation by a user.

10. The method of claim 1, wherein said result comprises ranked selectable interpretations displayed in an intermediate user interface component.

11. A non-transitory computer program storage device readable by computer, tangibly embodying a program of instructions executable by said computer to perform a method of integrating personal information search and interaction on web and desktop applications, said method comprising:
enabling a user-interface (UI) component of an application to enter a query of a personal information repository, based on a request for information by said UI component;
in response to said request, receiving natural language information that is entered into said computer;
parsing said natural language information based on a natural language grammar, to determine at least one natural language element;
generating element types associated with each of said at least one natural language element;
selecting a command from a command list based on matching arguments of said command to said element types and type information that indicates those element types that substitute for said arguments;
executing said command based on said matching arguments to determine a result from said personal information repository to said query;
outputting said result through said UI component by replacing said result for said request for information by said UI component to automatically add any of email addresses, attachments, and maps to said UI component.

12. The method of claim 11, wherein said result is based on a context of said UI component.

13. The method of claim 12, wherein said result is transformed based on information contained within said personal information repository.

14. The method of claim 11, wherein said UI component of said application is not directed to search.

15. The method of claim 11, wherein said parsing of said natural language information is based on a chart parser.

16. The method of claim 11, wherein said element types are based on parts of speech.

17. The method of claim 8, wherein said arguments are resolved based on information from said personal information repository.

18. The method of claim 11, wherein said element types are based on information from a plurality of information repositories.

19. A computer-implemented method for integrating personal information search and interaction on web and desktop applications comprising:
enabling, by a information handling/computer system, a user-interface (UI) component of an application to enter a query of a personal information repository, based on a request for information by said UI component;
in response to said request, receiving natural language information that is entered into said information handling/computer system;
parsing, by said information handling/computer system, said natural language information based on a natural language grammar and a chart parser, to determine at least one natural language element;
generating, by said information handling/computer system, element types comprising parts of speech associated with each of said at least one natural language element;
selecting, by said information handling/computer system, a command from a command list based on matching arguments of said command to said element types and type information that indicates those element types that substitute for said arguments, said arguments being resolved based in information from said personal information repository;
executing, by said information handling/computer system, said command based on said matching arguments to determine a result from said personal information repository to said query;
outputting, by said information handling/computer system, said result through said UI component by replacing said result for said request for information by said UI component to automatically add any of email addresses, attachments, and maps to said UI component, said result being based on context of said UI component and being transformed based on information contained within said personal information repository.

* * * * *